United States Patent
Ing et al.

(10) Patent No.: US 10,608,301 B2
(45) Date of Patent: Mar. 31, 2020

(54) POWER ELECTRONICS WITH INTEGRATED BUSBAR COOLING

(71) Applicant: NIO USA, Inc., San Jose, CA (US)

(72) Inventors: Adam H. Ing, Santa Clara, CA (US); Alexander J. Smith, White Lake, MI (US); Brittany M. Repac, Pleasanton, CA (US)

(73) Assignee: NIO USA, Inc., San Jose, CA (US)

( * ) Notice: Subject to any disclaimer, the term of this patent is extended or adjusted under 35 U.S.C. 154(b) by 199 days.

(21) Appl. No.: 15/689,557

(22) Filed: Aug. 29, 2017

(65) Prior Publication Data

US 2019/0067763 A1 Feb. 28, 2019

(51) Int. Cl.
| | | |
|---|---|---|
| H01M 10/655 | (2014.01) | |
| H01M 2/20 | (2006.01) | |
| H01M 10/613 | (2014.01) | |
| H01M 10/625 | (2014.01) | |
| H01M 10/653 | (2014.01) | |
| H01M 10/04 | (2006.01) | |
| H01M 10/663 | (2014.01) | |

(52) U.S. Cl.
CPC ......... *H01M 10/655* (2015.04); *H01M 2/206* (2013.01); *H01M 10/04* (2013.01); *H01M 10/613* (2015.04); *H01M 10/625* (2015.04); *H01M 10/653* (2015.04); *H01M 10/663* (2015.04); *H01M 2220/20* (2013.01)

(58) Field of Classification Search
CPC combination set(s) only.
See application file for complete search history.

(56) References Cited

U.S. PATENT DOCUMENTS

| | | | |
|---|---|---|---|
| 3,268,720 | A | 8/1966 | Meckler |
| 3,402,322 | A | 9/1968 | Meckler |
| 5,640,069 | A | 6/1997 | Nilssen |
| 6,368,119 | B2 | 4/2002 | Murakami |
| 6,443,748 | B1 | 9/2002 | Yuasa |
| 6,448,882 | B1 | 9/2002 | Inaba et al. |
| 6,478,585 | B2 | 11/2002 | Yuasa et al. |
| 6,494,723 | B2 | 12/2002 | Yamane et al. |
| 6,506,061 | B2 | 1/2003 | Yuasa et al. |

(Continued)

FOREIGN PATENT DOCUMENTS

CN 106252787 12/2016

OTHER PUBLICATIONS

Notice of Allowance for U.S. Appl. No. 15/689,766, dated Sep. 17, 2018 8 pages.

(Continued)

*Primary Examiner* — Kaity V Chandler
(74) *Attorney, Agent, or Firm* — Sheridan Ross P.C.

(57) ABSTRACT

Methods and systems for creating a battery module. A battery cell can include a cooling device that cools a busbar and a power electronics package. To allow the cooling device to be attached to the busbar and allow the cooling device to cool both the power electronics and the busbar, the cooling device is mounted on the busbar with the busbar held between two portions of the cooling device and with the power electronics mounted on an opposite side of the cooling device from the busbar. The fluid or phase change material may then circulate through a cavity in the cooling device to cool both the power electronics and the busbar.

20 Claims, 6 Drawing Sheets

(56) References Cited

U.S. PATENT DOCUMENTS

| | | |
|---|---|---|
| 6,603,283 B2 | 8/2003 | Yuasa et al. |
| 6,629,850 B2 | 10/2003 | Kato et al. |
| 6,650,087 B2 | 11/2003 | Yuasa et al. |
| 6,795,226 B2 | 9/2004 | Agrawal et al. |
| 6,990,999 B2 | 1/2006 | Patel |
| 7,104,845 B2 | 9/2006 | Higuchi et al. |
| 7,160,118 B2 | 1/2007 | Shirota |
| 7,358,292 B2 | 4/2008 | Miyoshi et al. |
| 7,613,003 B2 | 11/2009 | Pavlovic et al. |
| 7,767,905 B2 | 8/2010 | Meyer |
| 7,859,219 B2 | 12/2010 | Harris |
| 7,914,300 B2 | 3/2011 | Akahori et al. |
| 8,058,842 B2 | 11/2011 | Kai et al. |
| 8,142,235 B2 | 3/2012 | Lietz et al. |
| 8,207,704 B2 | 6/2012 | Kai et al. |
| 8,226,446 B2 | 7/2012 | Kondo et al. |
| 8,264,204 B2 | 9/2012 | Nagaoka et al. |
| 8,471,670 B2 | 6/2013 | Matsumoto |
| 8,852,773 B2 | 10/2014 | Yoon |
| 8,968,913 B2 | 3/2015 | Rosskamp et al. |
| 8,977,117 B2 | 3/2015 | Kreutzman |
| 9,003,649 B1 | 4/2015 | Romero et al. |
| 9,027,360 B2 | 5/2015 | Chainer et al. |
| 9,041,403 B2 | 5/2015 | Aoki |
| 9,077,019 B2 | 7/2015 | Kosaki et al. |
| 9,145,099 B2 | 9/2015 | Komiya et al. |
| 9,312,530 B2 | 4/2016 | Ogasawara et al. |
| 9,748,619 B2 | 8/2017 | Lida |
| 9,873,394 B2 | 1/2018 | Hachiya |
| 2006/0040526 A1* | 2/2006 | Shirota ............... B60R 16/0238 439/76.2 |
| 2006/0040527 A1* | 2/2006 | Shirota ............... H01R 9/2466 439/76.2 |
| 2011/0300421 A1* | 12/2011 | Iritani ................. H01M 10/625 429/72 |
| 2013/0082377 A1* | 4/2013 | Bennion et al. ........ H01L 23/36 257/712 |
| 2014/0295216 A1* | 10/2014 | Matsuda ............. H01M 2/1083 429/7 |
| 2015/0030890 A1* | 1/2015 | Inoue ................. H01M 2/1077 429/7 |
| 2016/0093855 A1* | 3/2016 | Tononishi ........... H01M 2/1077 429/156 |
| 2016/0218401 A1* | 7/2016 | Hermann ............ H01M 10/486 |
| 2017/0125866 A1 | 5/2017 | Zhou et al. |
| 2018/0034115 A1* | 2/2018 | Li ............................. G01K 7/22 |

OTHER PUBLICATIONS

U.S. Appl. No. 15/689,766, filed Aug. 29, 2017, Ing et al.
Official Action for U.S. Appl. No. 15/689,766, dated Mar. 29, 2018 11 pages.
"Q-CHILLTM Coldplates, High Performance Liquid Cooling," MaxQ Technology, 2016, retrieved from http://maxqtechnology.com/coldplates/, 7 pages.
"SAB0606-W -6 In × 6 In Water Cooled, Optical Breadboard," Base Lab Tools, 2016, retrieved from https://web.archive.org/web/20160313154114/http://maxqtechnology.com/coldplates/, 2 pages.

\* cited by examiner

POWER ELECTRONICS WITH INTEGRATED BUSBAR COOLING

FIELD

The present disclosure is generally directed to battery module construction, and more particularly to a battery module cooling configuration.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles (EVs).

Vehicles employing at least one electric motor and power system store electrical energy in a number of battery cells. These battery cells are typically connected to an electrical control system to provide a desired available voltage, ampere-hour, and/or other electrical characteristics. Advances in battery technology have resulted in the increasing use of large batteries, comprising tens, hundreds, or even thousands of individual cells, for applications such as powering various electrical components of vehicles (including vehicles designed for travel over land and water and through the air) and storing electricity generated using renewable energy sources (e.g. solar panels, wind turbines).

Many of the batteries described generates heat. Further, some battery designs incorporate numerous cells into a module. The battery modules often need to be cooled to operate more efficiently or safely. To cool the battery cells, battery modules can include various systems using a phase change material (PCM) or other liquid and/or gas to cool the battery modules. Unfortunately, the systems used to cool the module often focus on cooling only the batteries or another singular system, which makes these cooling systems less efficient and less effective.

DETAILED DESCRIPTION

Figure 1A:
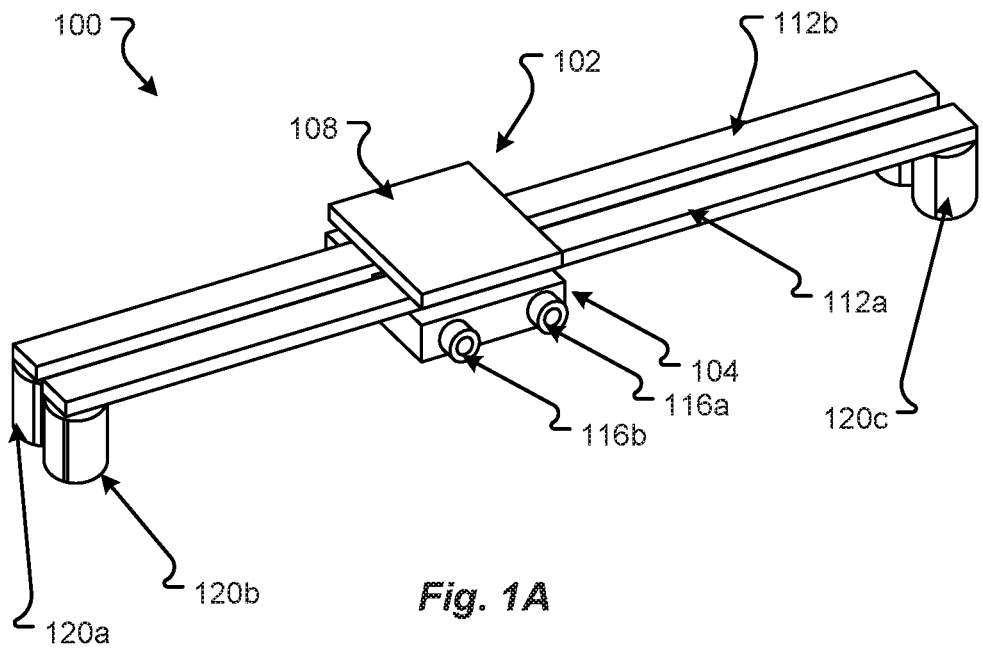
FIG. 1A is a perspective view of a cooling system integrated with one or more busbars in accordance with embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Battery cells can produce heat when either discharging or charging. Various systems and methods are available to conduct heat from the batteries and radiate the heat to atmosphere. Battery electric vehicles commonly keep all the high voltage electrical relays, busbars, and power electronics in a single enclosure called the junction box. It is advantageous to have these components in a single enclosure because: (1) they have similar electrical requirements, (2) it reduces routing distances between components, and (3) interfaces to the environment (dust/water interfaces) are minimized.

Electrical relays are rated for a continuous amount of current which is a function of their busbar sizing. The copper in the busbars passively conduct heat away from the relay then passively dissipate the heat though natural convection to the air ensuring the busbars do not overheat. Power electronics in EVs typically generate large amounts of heat in a very small area, and, to avoid overheating, will employ a forced convection air or liquid cooled heatsinks to carry the heat away.

The embodiments described herein combine the cooling requirement for the busbars and the power electronics in one heatsink. By having an active cooling interface for the busbar (rather than passive heat loss to the air), the busbar sizes can be reduced. By taking advantage of an existing heatsink for nearby power electronics, the overall system cost and mass can be reduced. Rather than using the cooling interface from power electronics, a header block (coolant outlet to the battery pack), with a similar thermal contact interface, can be employed. This thermal contact interface can also be used for cable management purposes (vibration management).

Figure 1B:
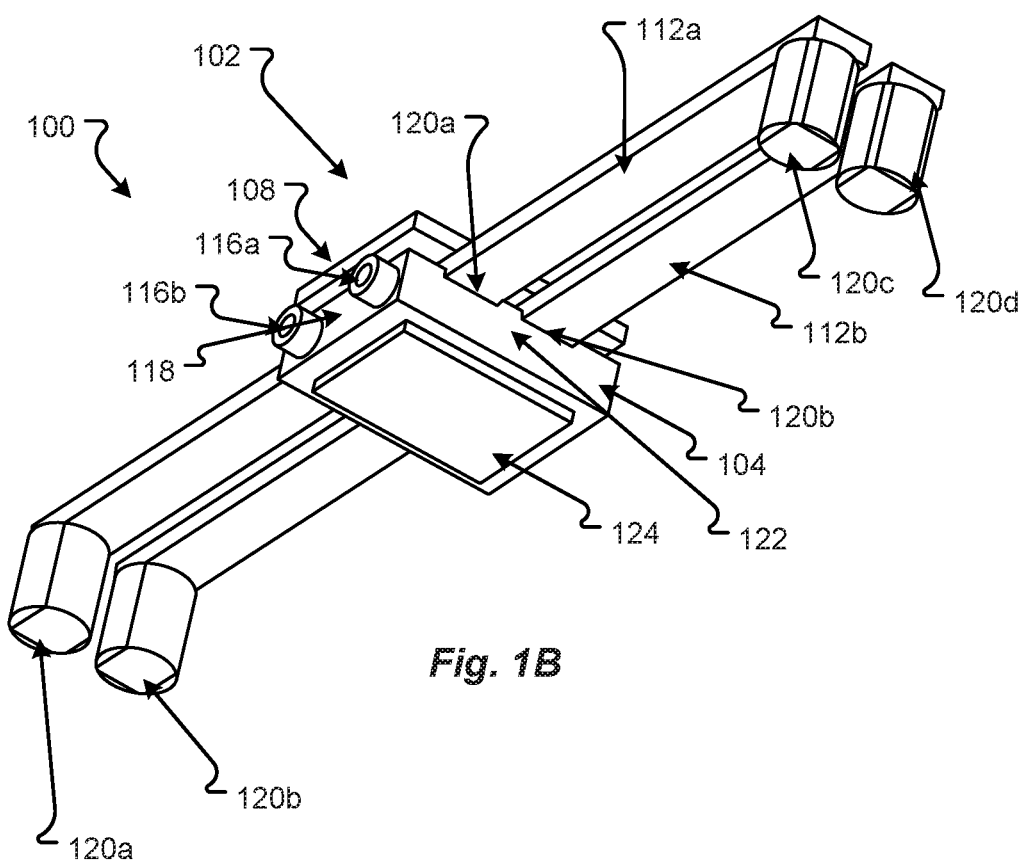
FIG. 1B is another perspective view of a cooling system integrated with one or more busbars in accordance with embodiments of the present disclosure.
Figure 1C:
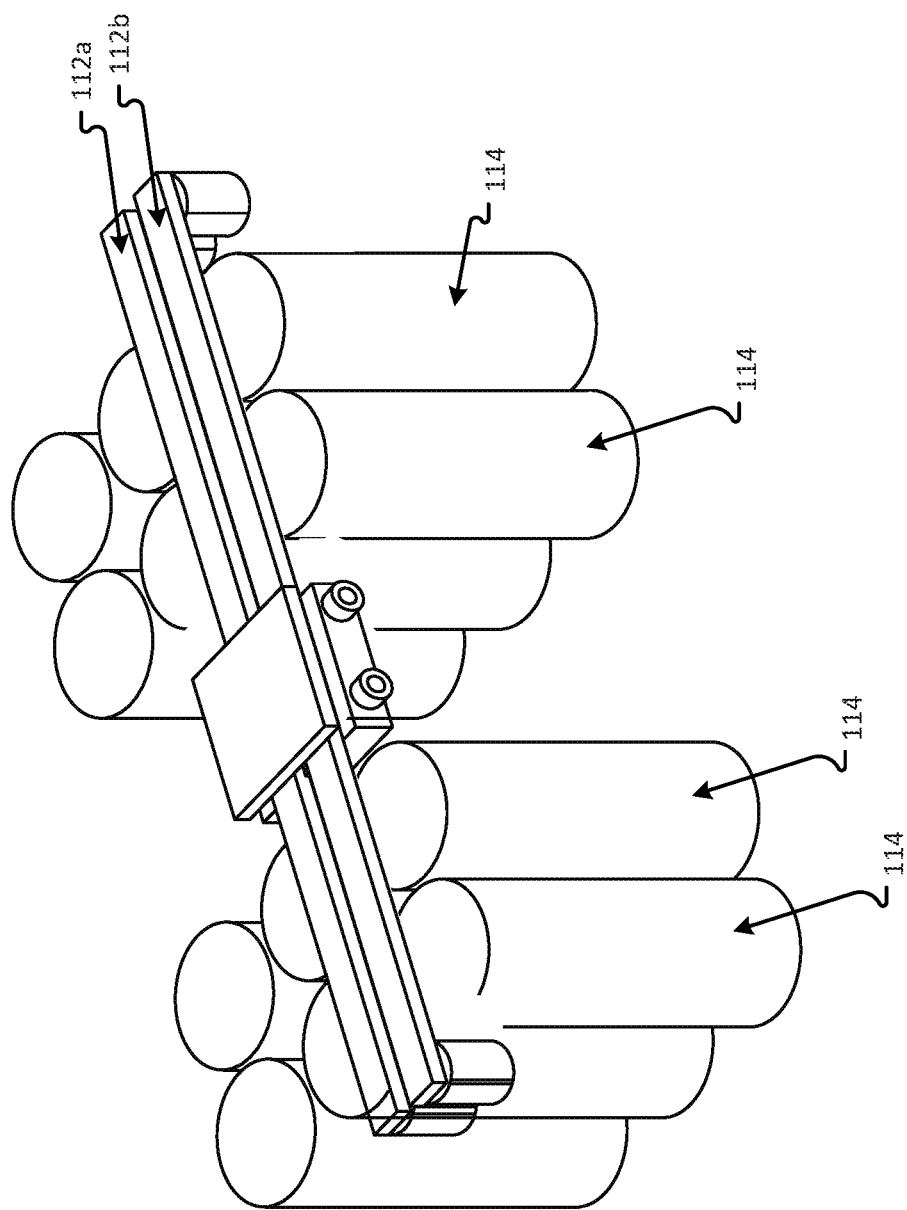
FIG. 1C is a perspective view of a battery module a cooling system integrated with one or more busbars in accordance with embodiments of the present disclosure.

A cooling apparatus 100 attached to one or more busbars 112 may be as shown in FIGS. 1A-1C in accordance with one or more embodiments described herein. The system 100 can include a cooling device 102 generally formed from a top plate 108 and a bottom portion 104. The top plate 102 may engage the top of busbar(s) 112a, 112b, while the busbar(s) 112 can nest into the bottom portion.

The busbars 112 may be elongated electrically conductive materials being generally formed as shown in FIGS. 1A-1C. As shown in FIG. 1C, the busbars 112 may be electrically connected to one or more battery cells 114. Further, the busbar 112 may be in physical contact with the batteries 114 to conduct heat from the batteries into the busbars 112.

The busbars 112 may also include one or more terminals 120a, 120b, 120c, and/or 120d. The busbars 112 can carry different polarities of electrical current coming from one or more battery cells 114 attached, welded, or affixed thereto. The busbars 112 generally can have any shape.

In accordance with the embodiments described herein, the busbars 112 may then be attached, affixed, or connected to the cooling device 102. There may be different methods of attaching or affixing the busbars 112 to the cooling device 102. In some configurations, the busbars 112 may seat into a cavity formed in the bottom portion 104 of the cooling device 102. In other configurations, the busbars 112 can be mechanically attached to the cooling device 102, with one or more clasps, screws, bolts, etc., may be adhered to the cooling device 102, may be welded to the cooling device 102, etc. Regardless of the attachment method, the cooling device 102 can conduct heat from the busbars 112.

The cooling system 102 may be made from a thermally conductive material, for example, aluminum, copper, steel, stainless steel, etc. In at least some configurations, the material for the top portion 108 and bottom portion 104 may not be electrically conductive. In other configurations, there may be a thermally conductive material that is not electrically conductive that spaces or is provided between the top portion 108 and the busbars 112 and between the bottom portion 104 and the busbars 112. In some configurations, the busbars 112 can also be made from aluminum, copper, or other metallic materials that are both electrically and thermally conductive.

Another view of the device 102 connected to the busbars may be as shown in FIG. 1B. From the view shown in FIG. 1B, the power electronics module 124 can be seen mounted, adhered, affixed, etc. to the bottom of the bottom portion 104 of the cooling device 102. The power electronics 124 can be any electronics needed for power conversions, power management, etc. and associated with the electricity either on the busbar 112 going to systems within the vehicle, or from the vehicle going to the busbar 112. Also shown in view of FIG. 1B are the two indentions or trenches 120a, 120b formed within the bottom portion 104 to accept the busbars 112. The power electronics may also have passthroughs through the cooling system with VIAs through the bottom portion 104 that physically connect the busbars 112 with the power electronics 124.

Another view of the device 102 connected to the busbars may be as shown in FIG. 1B. From the view shown in FIG. 1B, the power electronics module 124 can be seen mounted, adhered, affixed, etc. to the bottom of the bottom portion 104 of the cooling device 102. The power electronics 124 can be any electronics needed for power conversions, power management, etc. and associated with the electricity either on the busbar 112 going to systems within the vehicle, or from the vehicle going to the busbar 112. Also shown in view of FIG. 1B are the two indentions or trenches 120a, 120b formed within the bottom portion 104 to accept the busbars 112. The power electronics may also have passthroughs through the cooling system with at least one vertical interconnection access (via) through the bottom portion 104 that physically connect the busbars 112 with the power electronics 124.

Further, one or more connections 116 to the cooling system are also shown in FIGS. 1A and 1B in the front profile 118. A fluid intake 116a can receive the PCM or fluid and an outtake 116b can send the PCM or fluid back to the cooling system. In this way, a constant flow of PCM or fluid is provided to the interior of the bottom portion 104 of the cooling device 102.

The top portion 108 may be connected or physical coupled to the bottom portion 104 with bolts, screws, or other mechanical attachment driven or passed through the top portion 108 or bottom portion 104 into the top portion 108 or bottom portion 104. This physical connection then can create a compressive force on the busbars 112 sitting in the trenches 128, which allows the system 100 to remain interlocked and possibly provide further conductive cooling between a top portion 108 and the bottom portion 104.

The electronics 124 may be mounted to the bottom plate of the bottom portion 104 by adhering the electronics 124 to the bottom portion 104 with an adhesive or other type of chemical-based interconnection, may be affixed by a mechanical system or fastener, such as a screw or bolt, or may be attached by welding the power electronics 124 or physically adhering or attaching the power electronics 124 to the bottom portion.

Figure 2:
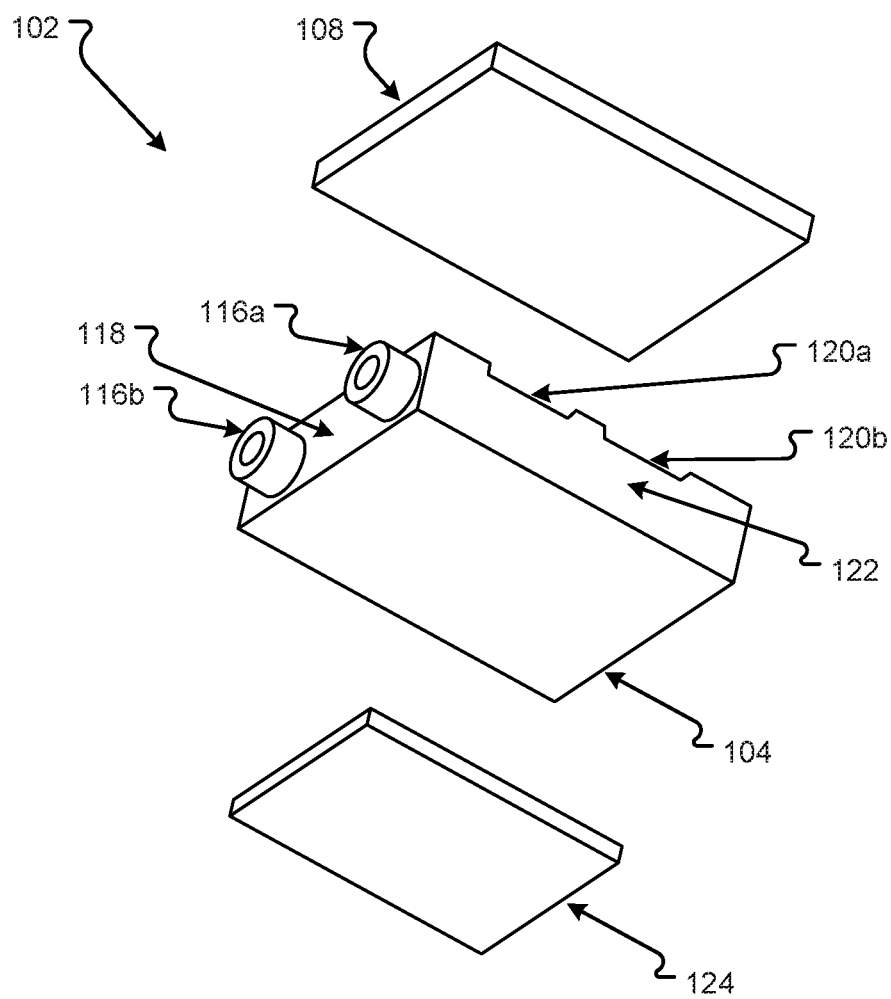
FIG. 2 shows an exploded perspective view of a cooling device in accordance with embodiments of the present disclosure.
Figure 3A:
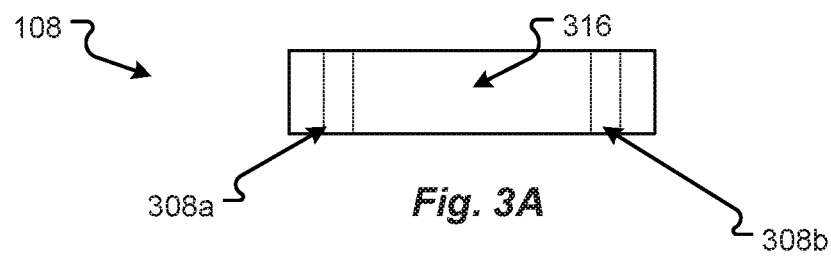
FIG. 3A is a plan view of a top plate of a cooling device in accordance with embodiments of the present disclosure embodiment.
Figure 3B:
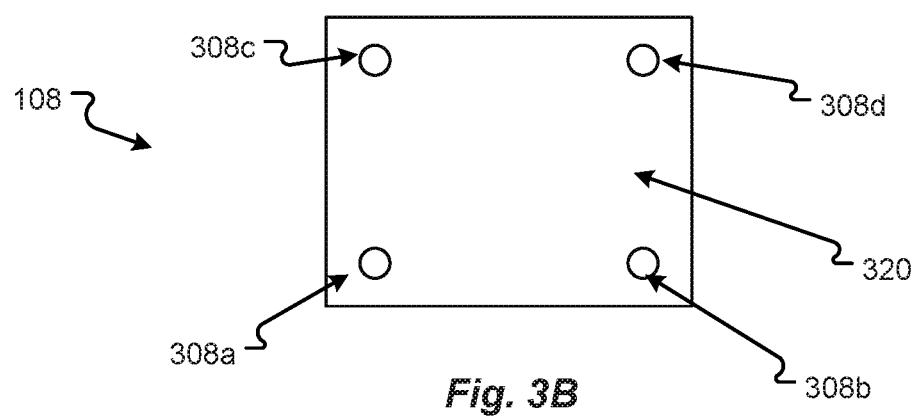
FIG. 3B is another plan view of a top plate of a cooling device in accordance with embodiments of the present disclosure embodiment.
Figure 3C:
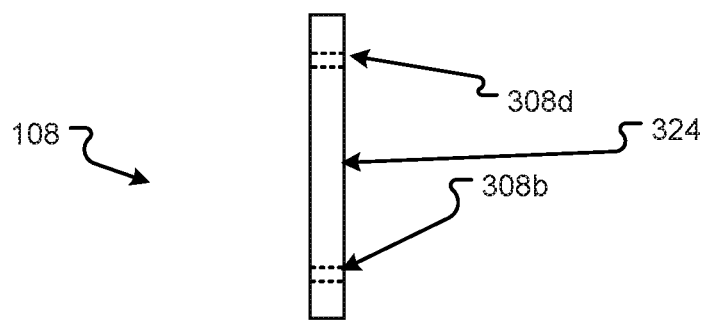
FIG. 3C is another plan view of a top plate of a cooling device in accordance with embodiments of the present disclosure embodiment.
Figure 3D:
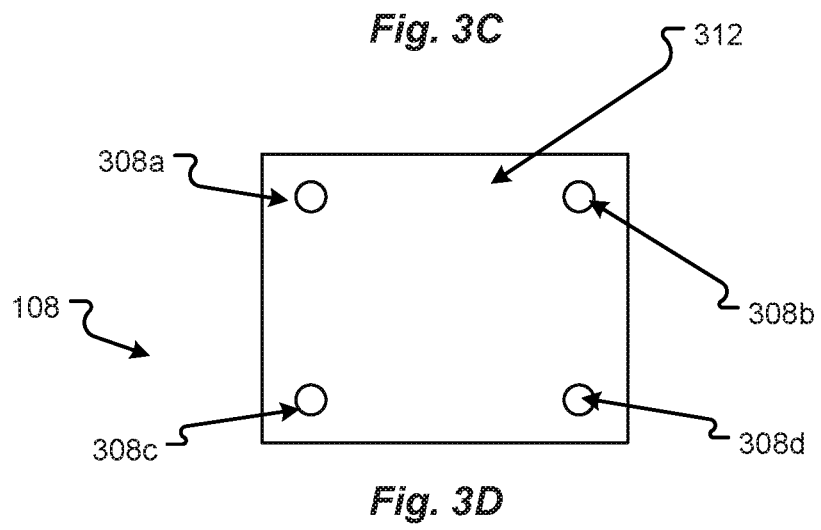
FIG. 3D is another plan view of a top plate of a cooling device in accordance with embodiments of the present disclosure embodiment.

A perspective, exploded view of the cooling device 102 may be as shown in FIG. 2. The three elements of the cooling device 102, the top portion 108, the bottom portion 104, and the power electronics package 124 are generally as shown in FIG. 2. The bottom portion, in the configuration shown, can concurrently provide for enhanced cooling of the busbar(s) that are seated in the trenches/cavities 120 and the power electronics 124.

It should be noted that the terms bottom portion 104 and top portion 108 are not meant to connote an orientation of the cooling device 102 in relation to the ground. Rather, these terms are used simply to provide a means to separately identify the two portions 104, 108 of the cooling device 102. In some configurations, the cooling device 102 may be formed from a single piece of metal, material, or construct and the busbar(s) 112 are inserted or pass through an opening in the cooling device 102. With this configuration, fluid may flow through the bottom and top of the cooling device 102 as each portion may have a cavity to allow for flow of the PCM or cooling fluid. Further, the top portion 108, in some configurations, may have a separate set of connections 116 to the cooling system. In this way, the top portion 108 can also provide cooling of the busbars 112. Still further, the cooling device 102 is shown with a particular shape and with a particular shape for the trenches 120. However, it should be noted that the cooling device 102 can have any number of different shapes or configurations, with various shapes, orientations, or configurations for the trenches 120 based on the busbar 116 shape, orientation, and/or configuration. The cooling device 102 simply needs to conduct heat from the busbar 116 and/or power electronics 124 and not interfere with the electrical performance of the busbar 116 and/or power electronics 124.

Plan views of the top portion 108 may be as shown in FIGS. 3A-3D. In these views, the top portion 108 shown can be a solid piece of material (for example, aluminum). The top portion 108 can optionally include (depending on how the cooling device 102 is mounted to the busbar 112) one or more holes 308a-308d. The holes 308 may travel through the depth of the bottom portion 108. In some configurations, the holes may be tapped and threaded to accept a bolt or screw to connect the top portion 108 to the bottom portion 104. The shape of the bottom portion 108 is shown as a square but may be other shapes depending on the requirements of the busbar attachment and/or the form factor of the battery module. Further, the top portion 108, in some configurations may have trenches 120 formed into the bottom profile 312 to nest the busbar 112. In FIGS. 3A-3D, a first side 316, a top profile 320, a second side profile 324, and a bottom profile 312 are shown, respectively.

Figure 4A:
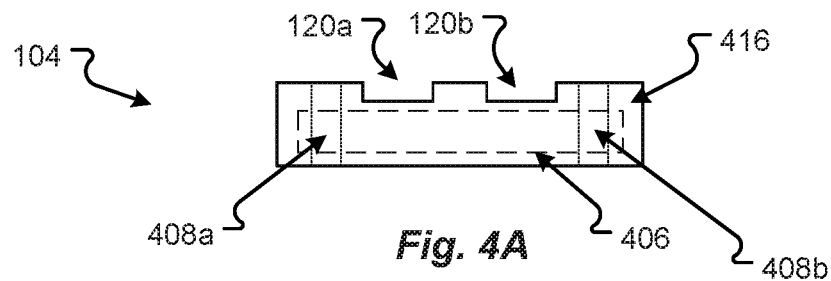
FIG. 4A is a plan view of a bottom portion of a cooling device in accordance with embodiments of the present disclosure embodiment.
Figure 4B:
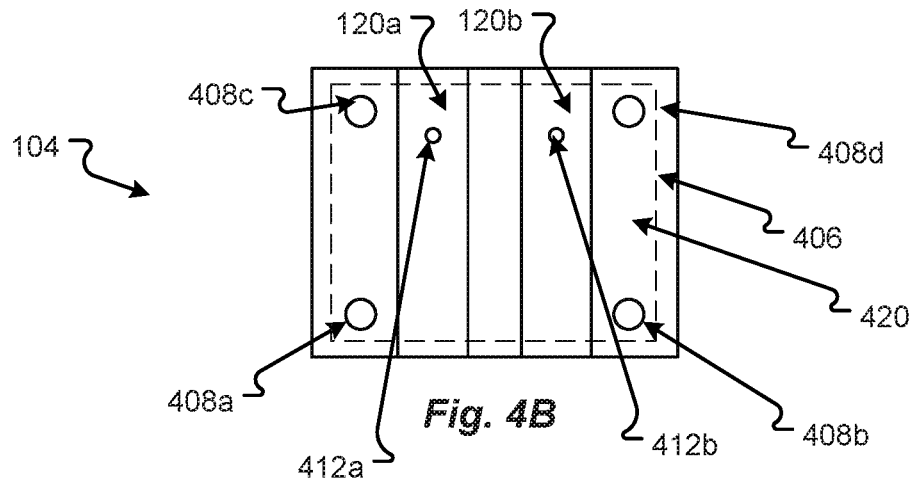
FIG. 4B is another plan view of a bottom portion of a cooling device in accordance with embodiments of the present disclosure embodiment.
Figure 4C:
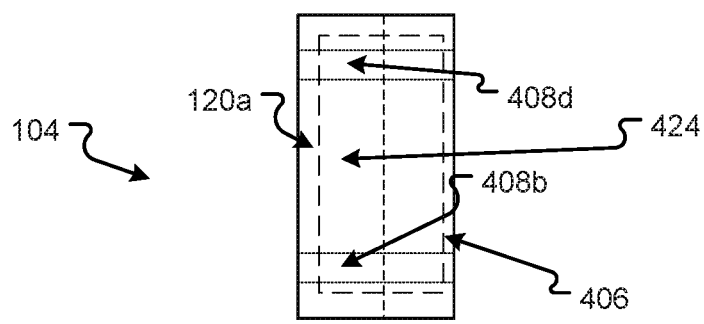
FIG. 4C is another plan view of a bottom portion of a cooling device in accordance with embodiments of the present disclosure embodiment.
Figure 4D:
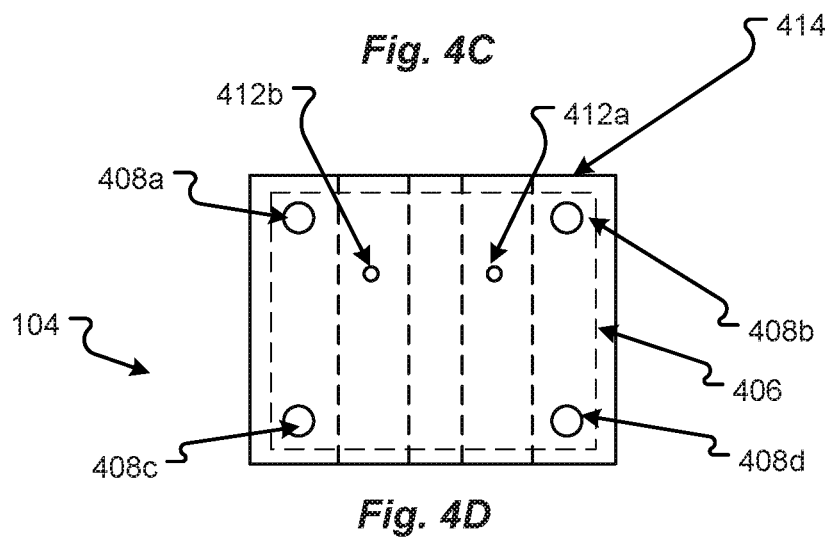
FIG. 4D is another plan view of a bottom portion of a cooling device in accordance with embodiments of the present disclosure embodiment.

Plan views for the bottom portion 104 may be as shown in FIGS. 4A-4D. In FIGS. 4A-4D, a first side 416, a top profile 420, a second side profile 424, and a bottom profile 414 are shown, respectively. The bottom portion 104 can include a trench 120 formed through the length of the top portion 108, as shown in FIG. 4B. Each trench 120 generally has the same profile as the busbar 112 and can accept or mate with a busbar 112. As shown in FIGS. 4A-4D, there can be two or more trenches 120 in the configuration of the bottom portion 104, depending on how many busbars 112 the cooling device 102 spans. However, in other configurations, there may be a single trench 120 to mate with a single busbar 112. The busbar 112 can be pressure-fit into the trench 120 to hold statically the busbar 112 in the trench 120. In other configurations, the busbar 112 may be glue, adhered, screwed, bolted, welded, or attached with some other mechanism or coupling. Still further, there may be an electric insulator formed or placed between the busbar 112 and the trench 120 that allows for heat conduction but prevents electric conduction.

Further, the bottom portion 108 can include holes or threaded holes 408a-408d. The holes 408 can accept a screw or bolt provided through holes 308A-308D in the top portion 108. There may be a bolt then affixed to the end of the bolt running through the holes 408. In other configurations, the holes 408 are tapped and threaded to accept the bolt or screw without a separate nut. The holes 308, 408 are optional as there may be other ways to connect or couple physically the top portion 108 with the bottom portion 104 around the busbar 112.

Further, the bottom portion 104 can include a cavity 406 that allows for the circulation of fluid from the cooling system into and through the bottom portion 104. The circulation of this fluid within the cavity 416, provided within the interior of the bottom portion 104, allows for the cooling of the bottom portion 104 and thus the cooling of the busbars 112 and power electronics 124. The configuration of the cavity 416 is shown as a square but may be other shapes depending on the requirements of the cooling and fluid dynamics of the cooling device 102. The cavity 416 can accept a phase change material or other cooling liquid that conducts heat from the bottom portion 104 into the phase change material or liquid. The inlet 116a and/or outlet 116b for the cavity 406 may be as shown in FIGS. 1A-2. although other inlet 116a and outlet 116b configurations are possible.

Further, the bottom portion 104 may have one or more vertical interconnection access (via) or passthroughs 412a-412b. These vias 412 allow for the connection of the power electronics 1124 to the busbar 112 through the bottom portion 104. As such, the vias 412 can be holes that are sealed from the cavity 406 and may be lined with an insulating material to prevent shorting to the bottom portion 104.

Figure 5:
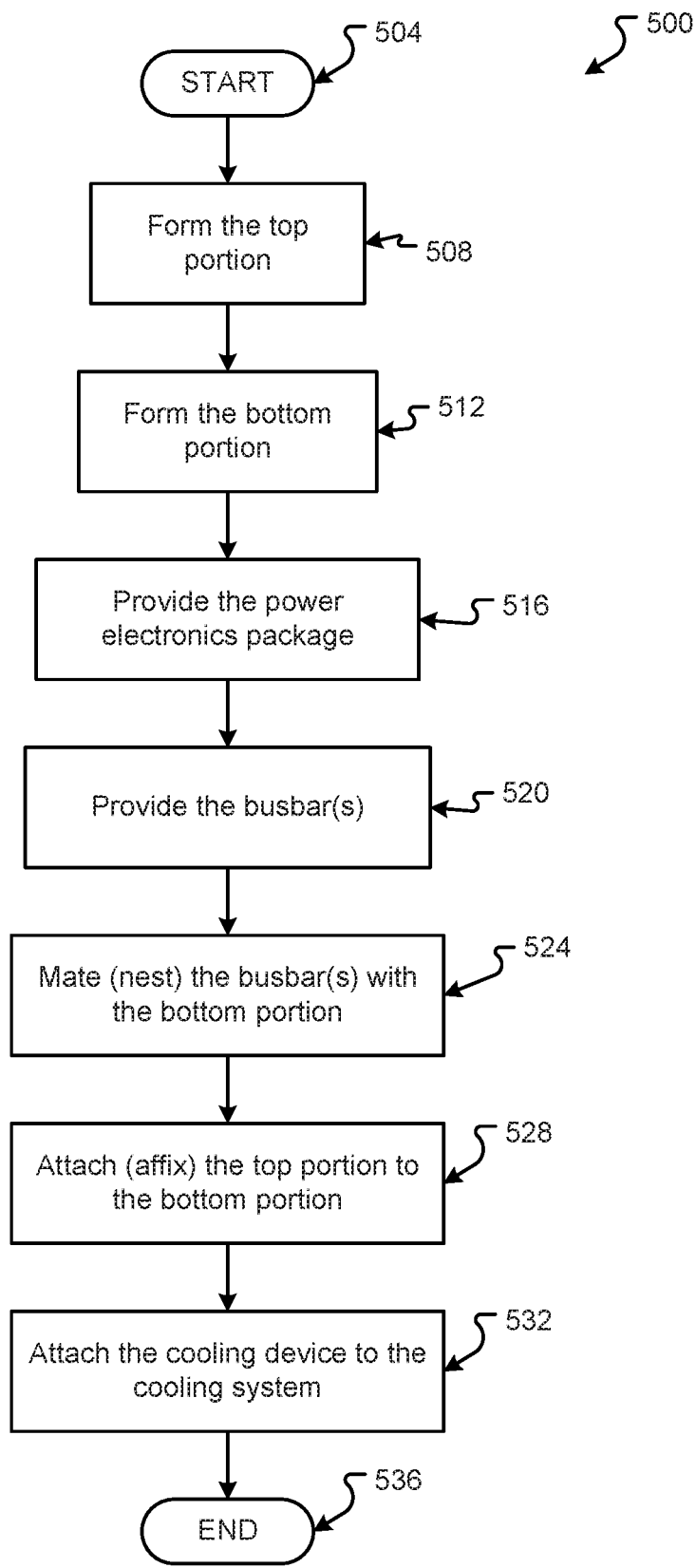
FIG. 5 provides a flowchart for a method of using a cooling device in accordance with embodiments of the present disclosure.

An embodiment of a method 500 for creating/employing the cooling device 102 may be as shown in FIG. 5 in accordance with embodiments of the present disclosure. While a general order for the steps of the method 500 is shown in FIG. 5, the method 500 can include more or fewer steps or can arrange the order of the steps differently than those shown in FIG. 5. Generally, the method 500 starts with a start operation 504 and ends with an end operation 536. The method 500 can be used in conjunction with an EV or other system that requires cooling of electrical parts. Hereinafter, the method 500 shall be explained with reference to the systems, components, assemblies, devices, environments, etc. described in conjunction with FIGS. 1-4D.

The top portion 108 of the cooling device 102 may be formed, in step 508. The top portion 108 may be formed through injection molding, milling, or other types of manufacturing processes. The formation of the top portion 108 can also include any type of development of the materials such as aluminum or copper used to create the top portion 108. For example, the melting of the material, e.g., aluminum, introducing the molten material into a cast, and/or other types of processes. The top portion 108 may also be milled to include drilling the one or more holes 308 used for attachment to the bottom portion 104 (which can also include tapping the holes 308 to create threads, which may be needed to attach the top portion 108 to the bottom portion 104.

Similar to the top portion 108, the bottom portion 104 may be formed, in step 512. As with the top portion 108, the formation of the bottom portion 104 may include any type of milling, metal processing, etc. used to create the bottom portion 104, with the cavity 406, holes 408, trenches 120, and/or vias 412. Further, the bottom portion 104 may also include the formation, attachment, and/or or adherence of any type of thermally conductive material that is not electrically conductive into the trenches 120 or other surfaces of the bottom portion 104 (and/or top portion 108) to ensure that the bottom portion 104 (and/or top portion) is electrically insulated from the busbars 112. Thus, the bottom and top portions 104, 108 cannot conduct electricity from the busbars 112.

The power electronics 124 may be provided in step 516. For example, after the creation of the power electronics module 124, the power electronics module 124 may be provided for attachment to the bottom portion 104. The power electronics 124 can be encased in some type of covering or housing. This housing may be adhered, affixed, attached, etc. to the bottom portion 104 through various processes such as gluing or physical attachment with screws or other types of mechanical devices. A electrical conductor (s) from the power electronics 124 can also be inserted through the vias 412 to be electrically connected to the busbar 112.

The busbars 112 may be provided, in step 520. The busbars 112 may be formed or manufactured and provided for the process 500 to be physically mated with the bottom portion 104. The busbars 112 can be provided with markings or indications along the busbar for the location of the mounting of the bottom portion 104 and/or top portion 108. The busbars 112 may then be mated to the bottom portion, in step 524. The mating of the busbars 112 may be the insertion of the busbar 112 into the trenches 128. Further, the process of mating the bottom portion 104 with the busbar 112 can include the attachment or adherence of the thermally conductive material that electrically insulates the bottom portion 104 and/or top portion 108 from the busbars 112. Further, a conductor from the power electronics 124 that is inserted through the via 412 may be attached or electrically coupled to the busbar 112.

The top portion 108 is then attached or affixed to the bottom portion, in step 528. Here, the top portion 108 may be placed in physical proximity and on distal to the busbar(s) 112. Bolts, screws, or other physical attachment may then be provided through the holes 308 into the mating holes 408 on the bottom portion 104. In other configurations, the screws or bolts may be provided through the holes 408 into the mating holes 308. The bolts or screws may be tightened to compress the top portion 108 onto the bottom portion 104 and holding the busbar 112. In other configurations, the system may be glued onto the busbars 112 or there may be a different type of physical attachment used.

Once the cooling device 102 is attached to the busbar(s) 112 to form the system 100 and assembled into the battery module, the inlet 116a and outlet 116b may then be attached or fluidly coupled to the cooling fluid or phase change material of the cooling system, in step 532. The cooling fluid may then circulate through the cavity 406 of the bottom portion 104 to thermally cool the bottom portion 104, the busbars 112, the top portion 108, and/or the power electronics 132. With the connection of the cooling fluid, the battery module may be installed in the vehicle.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the connection of a busbar and power electronics to a cooling device. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments of the present disclosure include a battery module comprising: power electronics; a busbar; and a cooling device, wherein the power electronics are mounted to the cooling device and the busbar, wherein the cooling device thermally cools both the power electronics and the busbar.

Any of the one or more of the above aspects, wherein the cooling device is formed from a thermally conductive material.

Any of the one or more of the above aspects, wherein the cooling device comprises: a top portion; and a bottom portion.

Any of the one or more of the above aspects, wherein the busbar is compressed between the top portion and the bottom portion.

Any of the one or more of the above aspects, wherein the bottom portion comprises a trench in which the busbar nests.

Any of the one or more of the above aspects, wherein a mechanical attachment attaches the top portion to the bottom portion.

Any of the one or more of the above aspects, wherein the mechanical attachment is two or more bolts threaded through the bottom portion into the top portion.

Any of the one or more of the above aspects, wherein the bottom portion comprises a cavity within the bottom portion into which a cooling substance circulates to cool the bottom portion.

Any of the one or more of the above aspects, wherein an electric insulator is applied to the trenches to insulate electrically the bottom portion from the busbar.

Any of the one or more of the above aspects, wherein two or more busbars are compressed between the top portion and the bottom portion.

Embodiments of the present disclosure include a method of creating a battery module, comprising: providing a cooling device comprising: a bottom portion to circulate a fluid that cools the bottom portion; a top portion; providing a busbar; providing a power electronics package; mounting the power electronics package to a first side of the bottom portion; attaching the cooling device to the busbar such that the busbar is held between the top portion and the bottom portion.

Any of the one or more of the above aspects, wherein attaching the cooling device comprises mechanically coupling the top portion to the bottom portion.

Any of the one or more of the above aspects, wherein mechanically coupling the top portion to the bottom portion comprises threading a bolt through the top portion into the bottom portion to connect the top portion and the bottom portion.

Any of the one or more of the above aspects, wherein an electrical conductor is inserted through a via in the bottom portion to couple electrically the power electronics package with the busbar.

Any of the one or more of the above aspects, wherein the cooling device is fluidly connected to the cooling system of a vehicle to provide the fluid that cools the bottom portion, which cools the busbar and the power electronics package.

Embodiments of the present disclosure include a battery module comprising: power electronics; a busbar; and a cooling device comprising: a top portion; and a bottom portion, wherein the power electronics are mounted to a first side of the bottom portion, wherein the cooling device is mounted on the busbar such that the busbar is held between the top portion and the bottom portion, and wherein the cooling device thermally cools both the power electronics and the busbar.

Any of the one or more of the above aspects, wherein the bottom portion is formed from a thermally conductive material, and wherein the bottom portion comprises a cavity within the bottom portion into which a cooling substance circulates to cool the bottom portion Any of the one or more of the above aspects, wherein the bottom portion comprises a trench in which the busbar nests, and wherein an electric insulator is applied to the trenches to insulate electrically the bottom portion from the busbar.

Any of the one or more of the above aspects, wherein a mechanical attachment attaches the top portion to the bottom portion, and wherein the mechanical attachment is two or more bolts threaded through the bottom portion into the top portion.

Any of the one or more of the above aspects, wherein two or more busbars are held between the top portion and the bottom portion.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A battery module comprising:
   power electronics;
   a busbar coupled to one or more batteries; and
   a cooling device, wherein the power electronics are mounted to the cooling device, wherein the cooling device is mounted to the busbar, wherein the cooling device thermally cools both the power electronics and the busbar,
   wherein the cooling device includes a top portion and a bottom portion,
   wherein the power electronics are mounted to a first side of the bottom portion,
   wherein the busbar is sandwiched between a second side of the bottom portion and the top portion, the second side being opposite the first side,
   wherein the bottom portion includes a cavity in which a cooling substance circulates, and
   wherein the bottom portion includes at least one vertical interconnection access (via) traveling through the cavity between the first side and the second side to make electrical connection between the power electronics and the busbar.

2. The battery module of claim 1, wherein the cooling device is formed from a thermally conductive material.

3. The battery module of claim 2, wherein the at least one via includes an insulation material surrounding an electrical conductor.

4. The battery module of claim 3, wherein the busbar is compressed between the top portion and the bottom portion.

5. The battery module of claim 4, wherein the bottom portion comprises a trench in which the busbar nests.

6. The battery module of claim 5, wherein a mechanical attachment attaches the top portion to the bottom portion.

7. The battery module of claim 6, wherein the mechanical attachment is two or more bolts threaded through the bottom portion into the top portion.

8. The battery module of claim 7, wherein, in a plan view, the cavity occupies a central region of the bottom portion.

9. The battery module of claim 8, wherein an electric insulator is applied to the trenches to electrically insulate the bottom portion from the busbar.

10. The battery module of claim 9, wherein two or more busbars are compressed between the top portion and the bottom portion.

11. A method of creating a battery module, comprising:
    providing a cooling device comprising:
      a bottom portion to circulate a fluid that cools the bottom portion;
      a top portion;
    providing a busbar;
    providing one or more batteries electrically coupled to the busbar;
    providing a power electronics package;
    mounting the power electronics package to a first side of the bottom portion;
    attaching the cooling device to the busbar such that the busbar is held between the top portion and a second side of the bottom portion opposite the first side,
    wherein the bottom portion includes a cavity in which a cooling substance circulates, and
    wherein the bottom portion includes at least one vertical interconnection access (via) traveling through the cavity between the first side and the second side to make electrical connection between the power electronics package and the busbar.

12. The method of creating a battery module of claim 11, wherein attaching the cooling device comprises mechanically coupling the top portion to the bottom portion.

13. The method of creating a battery module of claim 12, wherein mechanically coupling the top portion to the bottom portion comprises threading a bolt through the top portion into the bottom portion to connect the top portion and the bottom portion.

14. The method of creating a battery module of claim 13, wherein an electrical conductor is inserted through the at least one via, and wherein the at least one via in the bottom portion includes an insulation material.

15. The method of creating a battery module of claim 14, wherein the cooling device is fluidly connected to the cooling system of a vehicle to provide the fluid that cools the bottom portion, which cools the busbar and the power electronics package.

16. A battery module comprising:
   power electronics;
   a busbar coupled to one or more batteries; and
   a cooling device comprising:
      a top portion; and
      a bottom portion, wherein the power electronics are mounted to a first side of the bottom portion, wherein the cooling device is mounted on the busbar such that the busbar is held between the top portion and a second side of the bottom portion that is opposite the first side, and wherein the cooling device thermally cools both the power electronics and the busbar,
   wherein the bottom portion includes a cavity in which a cooling substance circulates, and
   wherein the bottom portion includes at least one (vertical interconnection access) (via) traveling through the cavity between the first side and the second side to make electrical connection between the power electronics and the busbar.

17. The battery module of claim 16, wherein the bottom portion is formed from a thermally conductive material.

18. The battery module of claim 16, wherein the bottom portion comprises a trench in which the busbar nests, and wherein an electric insulator is applied to the trenches to insulate electrically the bottom portion from the busbar.

19. The battery module of claim 16, wherein a mechanical attachment attaches the top portion to the bottom portion, and wherein the mechanical attachment is two or more bolts threaded through the bottom portion into the top portion.

20. The battery module of claim 16, wherein two or more busbars are held between the top portion and the bottom portion.

* * * * *